Sept. 26, 1961

H. J. THIELSCH 3,002,191

METHOD OF WELDING PIPE

Original Filed Dec. 3, 1954

*INVENTOR.*
HELMUT J. THIELSCH
BY David D. McKenney

ATTORNEY

Sept. 26, 1961 H. J. THIELSCH 3,002,191
METHOD OF WELDING PIPE
Original Filed Dec. 3, 1954 2 Sheets-Sheet 2

*INVENTOR.*
HELMUT J. THIELSCH
BY
*David D. McKenney*
ATTORNEY

United States Patent Office 3,002,191
Patented Sept. 26, 1961

3,002,191
METHOD OF WELDING PIPE
Helmut J. Thielsch, Cranston, R.I., assignor to Grinnell Corporation, Providence, R.I., a corporation of Delaware
Continuation of abandoned application Ser. No. 472,911, Dec. 3, 1954. This application Feb. 24, 1959, Ser. No. 794,675
3 Claims. (Cl. 29—483)

The invention relates generally to improvements in welding and more particularly has to do with solid consumable insert welding rings to facilitate butt welding of piping and tubing.

In recent years piping used in the steam generation of power and in many chemical processes has been required to withstand increasingly higher temperatures and pressures and has been exposed to increasingly corrosive conditions. This trend has in many instances necessitated the use of stainless steel piping capable of withstanding these severe temperature, pressure and corrosive conditions. As an example, one grade of steel which is now being widely used in power and chemical process piping is the columbium-stabilized austenitic stainless steel known as Type 347 grade. Other examples of piping material now being employed for severe service conditions are other stainless steel types, chrome-moly alloy steel and nonferrous materials such as copper, nickel, Monel and aluminum.

Piping or tubing of these materials having a wall thickness greater than one-eighth of an inch cannot have its sections satisfactorily joined together by welding in a single pass welding operation. Thus, if two sections of such heavy walled piping or tubing have their adjacent ends cut so as to fit close together throughout the entire pipe wall cross-section, the application of heat to the outside surface of the pipe at the joint to achieve a welding thereof would not provide sufficient penetration of fusion of the metal in the two sections to achieve a weld from the outside to the inside diameters of the piping. The fusion which is achieved has a cross-sectional area smaller than the total cross-sectional area of the pipe wall at the joint.

Accordingly, it has become the practice in welding together sections of heavy wall pipe, and in welding of such pipe sections to other equipment, to machine the adjacent ends which are to be joined by cutting away some pipe material a short distance back from the end of the section and part way in from the outside surface thereof, so that when the sections are brought together in contact with each other a substantial groove is formed which extends into the wall and has its bottom defined by the abutment together of the two lips or "roots" resulting from the removal of material as described. The root ends or faces, as they are called, which are abutted together are likewise machined flat so that they may make close engagement with each other when brought together or provide a uniform gap when spaced slightly apart. In some welding processes a small gap of 1/16 inch or less is desirable to compensate for the expansion resulting from the heat of the welding operation.

After this initial preparation of the pipe section ends by machining these ends may be welded together in two or more operations to achieve a finished weld across the whole wall thickness of the pipe. In the initial welding pass heat is applied to the roots abutted together at the bottom of the groove. Since the engaging root faces are substantially less thick than the pipe wall itself complete fusion of the metal in these roots is achieved across the entire root faces. This initial welding operation is known in the art as welding the "root pass." In subsequent operations the groove is filled with weld metal supplied by electrodes or welding rods of suitable composition.

In recent years as the temperatures and pressures in power piping have increased and as the process piping in the chemical and refinery industries have been called upon to handle increasingly corrosive fluids at high temperatures and pressures, a serious problem has arisen from failures in these welds, often taking the form of an initial notch in the root pass, such as results from incomplete penetration or micro-cracking in the root of the weld, propagates into a growing crack by mechanical or thermal fatigue, by shock and by corrosion—the last being known as stress corrosion. Furthermore, it has been determined that the austenitic stainless steels are particularly weak in the grain boundaries between 2000° F. and 1600° F., and as the fused root material passes through this range during cooling of the weld the stresses due to shrinking tend to produce microcracking failures at these grain boundaries. Because this microcracking of austenitic stainless steels takes place at elevated temperatures it is commonly referred to as "hot cracking."

It has been found that to some extent this undesirable microcracking can be avoided by improved design of the machined groove and of the root formed thereby, by removing all oxygen from the neighborhood of the joint during the application of heat in the welding operation, as for example by surrounding the joint with an inert gas, a technique known in the art as "purging," and by inserting into the interior of the pipe backing rings which fit closely to the inside pipe wall at the joint and to some extent may control the cooling rate of the fused material being welded. However, despite the efforts which have been made to solve the problem of microcracking by these devices, the problem remained substantially unsolved until it was discovered that the insertion of a quantity of material between the root faces was advantageous.

To accomplish this insertion of a welding material between the root faces prior to the welding of the root pass it has heretofore been attempted to bend a piece of specially shaped wire to the curvature of the root pass face and then tack-weld this piece of wire thereto. However, the proper bending of this wire into shape without twisting it and the necessary tack-welding of the wire to the root face at numerous places therearound has been found to be a delicate and difficult operation requiring a great deal of fit-up time and considerable skill. Furthermore, although the use of such wire has to some extent reduced the problem of microcracking in the root pass, the tack-welding of this wire to the root faces has itself been found to be the cause of microcracking in the areas tack-welded, this being particularly noticeable in certain types of stainless steels such as the Type 347 earlier referred to.

The present invention makes possible the enjoyment of the benefits resulting from the insertion of welding material between the root faces, without the disadvantages of extensive fit-up time or microcracking due to tack-welding which have hitherto attended the use of the insert wire, by providing a solid preformed consumable ring of selected material which may be inserted very quickly between the root faces without being bent to fit therearound and which may be held in place without tack-welding. Each ring is preformed to fit properly between the root faces of the pipe size with which it is intended to be used without any modification of its shape and has its sides adapted to lie against the root faces in substantially continuous contact therewith. Preferably the rings have an inside-to-outside diameter width somewhat in excess of the inside-to-outside diameter width of the root faces, thereby supplying at the weld sufficient additional fusible material to compensate for that shrinkage during cooling. Such shrinkage reduces the cross-sectional area of the fused material and where the fusible material at the joint (roots themselves and insert) is no wider than the root faces the shrinkage stresses may exceed the fused material strength and result in microcracking.

In the case where the piping sections to be welded together are so positioned in space that the root faces lie in planes which are horizontal or substantially so, and where no gap is required at the joint the improved solid insert ring of this invention may be located between the root faces by merely placing it on the lowermost of these faces and bringing the uppermost root face into contact with it. Normally the weight of the uppermost pipe section in this arrangement will serve to hold the improved solid insert ring firmly in place during the welding of the root pass.

Where more positive fixing of the improved insert ring in position is desired small projections extending from the sides of the ring to lie against the exterior or interior, or both the exterior and interior, surfaces of the root or a continuous flange or flanges on the ring and so extending, may be employed.

In cases where the pipe sections to be welded together are so disposed that the root faces lie in vertical planes (as in the case where the pipe sections are horizontal) or lie in planes tilted substantially from the horizontal, it is within the scope of this invention to so provide these projections or flanges that they overlie and rest upon the exterior root surface at the uppermost side of the pipe sections and overlie and rest upon the interior root surface at the lowermost side of the pipe sections. By this arrangement the ring has its weight supported on the roots in its proper position. In practice where such supporting of the ring is required, the ring is merely "hung" on one of the roots while the pipe sections are separated sufficiently to allow insertion of the ring between the root faces and the sections are then brought together until the root faces make firm contact with the ring sides.

In this last described disposition of the pipe sections to be welded, that is, where the root faces lie either in perpendicular planes or in planes tilted substantially from the horizontal, there is a tendency for fused metal in that portion of the root pass which is uppermost on the pipe to "sag" and extend downward an appreciable distance into the interior of the pipe before it cools and solidifies and a similar tendency for the fused metal in that portion of the root pass which is lowermost on the pipe to sag downward away from the interior of the pipe before it solidifies and leave a cavity in the joint at this location. With the improved solid insert ring of the present invention this weld metal "sag" can be very accurately compensated for by so locating the supporting projections or flanges that when the insert ring is located in place it is disposed eccentrically with respect to the root faces. Since the ring is circular this eccentricity automatically locates the insert welding material the proper distance above the position to which it will sag before solidifying at each point around the root pass.

One object of the present invention is to provide an improved form of consumable solid welding ring material for insertion between the root faces preparatory to the root pass welding of pipe section in piping and tubing systems.

Another object is to provide a consumable solid welding insert ring for the purpose described which is preformed to fit properly over the root faces of the particular joint to be welded.

Another object is to provide a consumable solid welding insert ring which contains enough material to compensate for shrinkage of the fused root material during cooling and to compensate for improper alignment of the pipe sections and improper abutting of the root faces against the insert material during the fit-up of the pipe sections preparatory to welding.

Another object is to provide a consumable solid insert welding ring as described which is properly located and held in place against the root faces without having to be rigidly secured to these faces preparatory to welding.

Another object is to provide a consumable solid welding insert ring as described which is preformed to have substantially the configuration of the root faces and substantially uniform thickness.

Another object is to provide a consumable solid welding insert ring as described which has the shape of a ring and has substantially uniform thickness.

Another object is to provide a consumable solid insert welding ring in which the inside-to-outside diameter width of the ring faces which lie against the root faces exceeds the corresponding width of the root faces.

Another object is to provide a consumable solid welding ring having projection from the sides thereof adapted to overlie the interior and/or exterior root surfaces and thereby locate the ring positively with respect to the root faces.

Another object is to provide a consumable solid insert welding ring with projections as described which are located on the ring so as to overlie the uppermost root surfaces when the root faces are in vertical planes or in planes tilted substantially from the horizontal, whereby the ring is supported against gravity in its proper location.

Another object is to provide a consumable solid insert welding ring with projections as described for supporting the ring in proper position against vertical or tilted root faces wherein the projections locate the ring eccentrically with respect to such faces and thereby compensate for weld metal sag during welding of the root pass.

The best modes in which it has been contemplated applying the principles of the present invention are shown in the accompanying drawings but the latter are to be deemed merely illustrative because it is intended that patent shall cover by suitable expression in the appended claims whatever features of patentable novelty exist in the invention disclosed.

Figure 4:
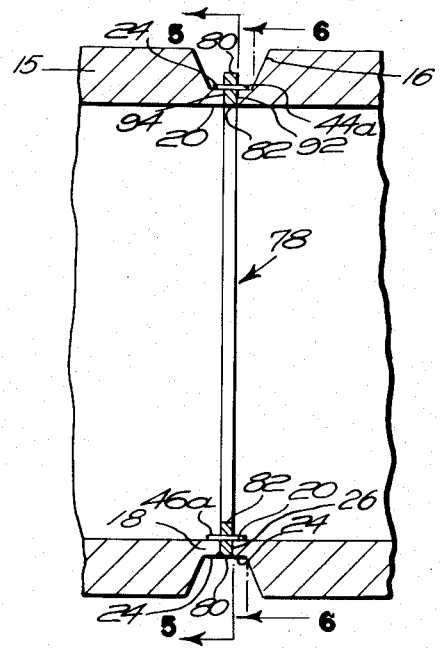
FIGURE 4 is a cross-sectional side elevation view of a pipe joint fit-up with the ring of FIGS. 1 to 3 eccentrically supported between the root faces.

Referring now more particularly to the drawings, one form of the consumable insert welding material of the present invention is a solid ring 78 having an outside diameter 80 and an inside diameter 82. In the fit-up of a pipe joint in which this ring is to be used, the adjacent ends of the pipe sections 15 are first prepared by having portions of these ends cut away as at 16 (FIGURE 4). A variety of cutaway configurations are currently in use with which the improved form of insert welding material of the present invention may be employed. Each of these cutaways involves the removal of material of the pipe at the end thereof diametrically inward from the exterior pipe surface part way through the wall thickness to leave a lip or root 18, as it is called, extending longitudinally of the pipe section with its interior side 20 formed by the interior pipe wall surface 22. The exterior root side 24 extends generally parallel to the interior root side 20 and the root end or face 26 defined by the interior and exterior root sides lies in a plane substantially perpendicular to the pipe section's longitudinal axis. From the inner end of the exterior root surface 24 the surface of the cutaway extends outward as at 30 to the exterior pipe section surface 32.

This cutaway 16 is normally achieved by a machining operation, and when the root faces 26 of two pipe sections thus machined are brought into contact with each other with the longitudinal axes of the pipe sections aligned the two cutaway sections 16 combine to form a groove with its bottom surface defined by the exterior surfaces 24 of the roots 18.

The consumable insert ring 10 is inserted between the root faces 26 so that these root faces engage the opposite ring sides 92 and 94.

While it is within the scope of the present invention to so form the insert welding ring 78 that when it is centered between the root faces 26 the inner and outer ring edges 80 and 82, respectively, are flush with the interior and exterior root surfaces 20 and 24, respectively, it is preferred that the ring be wider than the root faces, for example with the inside ring diameter somewhat smaller than the inside diameter of the pipe section and with the outside ring diameter somewhat greater than the outside diameter of the root face 26. The reason for this is that by having excess ring material either extending outward into the groove or into the pipe interior or both there is an excess of fusible ring material at the joint during the welding of the root pass. This excess of material increases the cross-sectional area of the root pass at the fused portion thereof and decreases the likelihood of microcracking in the root pass due to cooling stresses exceeding the strength provided by a small area of fused material. Furthermore, this slight excess of fusible material serves to prevent microcracking in cases where small gaps between the ring sides 92 and 94 and root faces 26 are desired, where the fit-up is poor because the longitudinal axes of the pipe sections are not properly aligned, or where improper machining of the root faces 26 prevents them from making full and continuous contact with the ring sides 92 and 94 when no gaps are desired.

Where the pipe sections to be welded are so disposed in space that the root faces lie in horizontal planes or in planes which are not substantially tilted from the horizontal so that in the fit-up the ring of the present invention may be rested in its proper location on the root face of the lower most pipe section and will remain there while the uppermost pipe section is brought down upon it, it is not necessary to provide structure on the ring for positively locating the ring with respect to the root faces. With proper care the ring may be suitably located until it is engaged on both of its sides 92 and 94 by the root face 26, whereupon the weight of the uppermost pipe section exerted downward on the ring will hold the ring firmly in place and prevent ring displacement during the welding operation.

Upon the application of the welding heat to the roots 18 and to the insert welding ring therebetween the fused metal of the roots and of the ring achieves sufficient viscosity before cooling to flow under the influence of gravity. In the case where the pipe sections were so disposed in space that the root faces 26 are substantially horizontal this tendency of the molten weld metal to flow, though it may influence the shape of the interior and exterior welding beads very slightly, does not result in any substantial movement of the fused metal from its initial location prior to becoming fused. Where, however, the pipe sections to be welded are so disposed in space that the adjacent root faces 26 lie in planes which are vertical or substantially tilted from the horizontal, this tendency of the fused weld metal to flow downward has resulted in the movement, prior to cooling, of a considerable amount of the fused material down into the pipe interior at the top of the weld, and, conversely, has resulted in the movement of a similar amount of fused material to a point substantially below the interior pipe surface 22 at the bottom of the weld.

This weld metal "sag," as it is called, presents a serious problem in cases where the interior surface of the piping system must be as smooth as possible, a condition required in the piping systems of many chemical processes where the pipe lines are periodically cleaned out by scraping or where local accumulations of matter on interior pipe line irregularities would result in plugging or excessive corrosion. In isolated instances it is possible to avoid this problem of weld metal sag by application of the source of heat to the roots only at the side of the piping sections and by rotating the piping sections themselves, keeping the heat source fixed. In the great majority of cases, however, it is not possible to rotate the piping sections themselves, and it is necessary to move the heat source around the groove 34 in making the root pass weld. In this most widely used procedure weld metal sag, as described, becomes a serious problem.

Figures 1, 3:
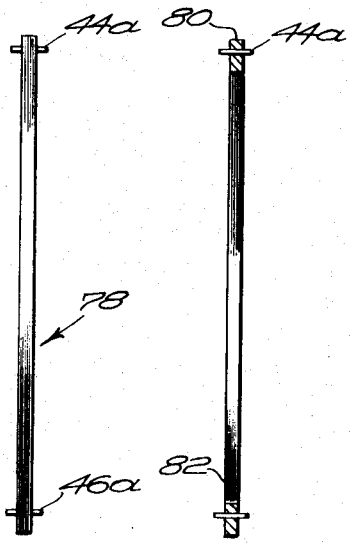
FIGURE 1 is an insert ring with pins so located as to eccentrically position the ring with respect to the root faces.
FIGURE 3 is a cross-sectional end elevation view of the ring of FIG. 1 taken as on line 3—3 of FIG. 2.
Figure 2:
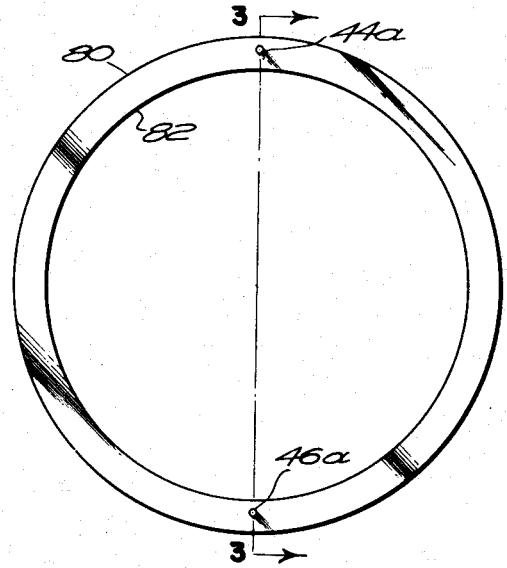
FIGURE 2 is a side elevation view of the ring of FIG. 1.

The modification of the improved consumable solid insert welding ring of the present invention which is shown in FIGS. 1 to 3 provides a very satisfactory solution to this problem of weld metal sag. This involves the location of the positive positioning and supporting means (which in FIGS. 1 to 3 are pins 44a and 46a) in such a manner that when the ring 78 is placed between the root faces 26 and positioned and supported there by means of the pins 44a and 46a, the ring is eccentrically disposed upwardly with respect to these root faces. Since the ring provides a portion of the fused metal and the direction of flow of this fused metal is downward under the influence of gravity, this upward eccentricity is by such an amount that after the downward flow of fused metal has taken place the sag is substantially compensated for.

Thus, referring to FIG. 4, it will be seen that the outside pin 44a and the inside pin 46a are so located in the ring 78 that the outer edge 80 of the ring 78 extends above the exterior of root surface 24 a greater amount than the corresponding outer edge of similar ring so extends where the ring is concentrically located with respect to the root faces. Likewise the inner edge 82 of the ring 78 adjacent the pin 44a is substantially flush with the interior root surface 20 rather than extending a slight amount into the interior of the pipe sections as does the corresponding edge of a similar concentric ring. This described eccentricity of the ring with respect to the root faces is further illustrated in FIG. 5, and FIG. 6 shows that such an eccentrically disposed ring compensates for weld metal sag to provide inside and outside root pass welding beads 84 and 86, respectively, which are of substantially the same size from top to bottom of the weld when the source of the welding heat 88 is moved with respect to the stationary pipe sections, as for example in the direction of the arrow 90.

Figure 5:
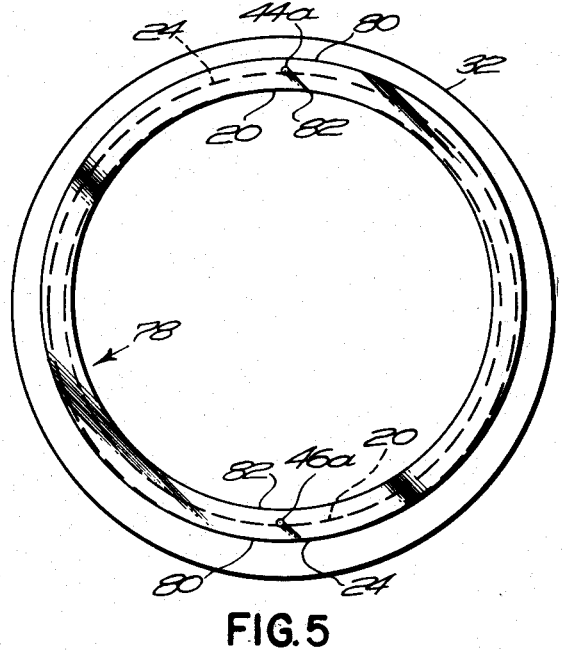
FIGURE 5 is a cross-sectional end elevation view of the fit-up of FIG. 4 taken as on line 5—5 of FIG. 4.
Figure 6:
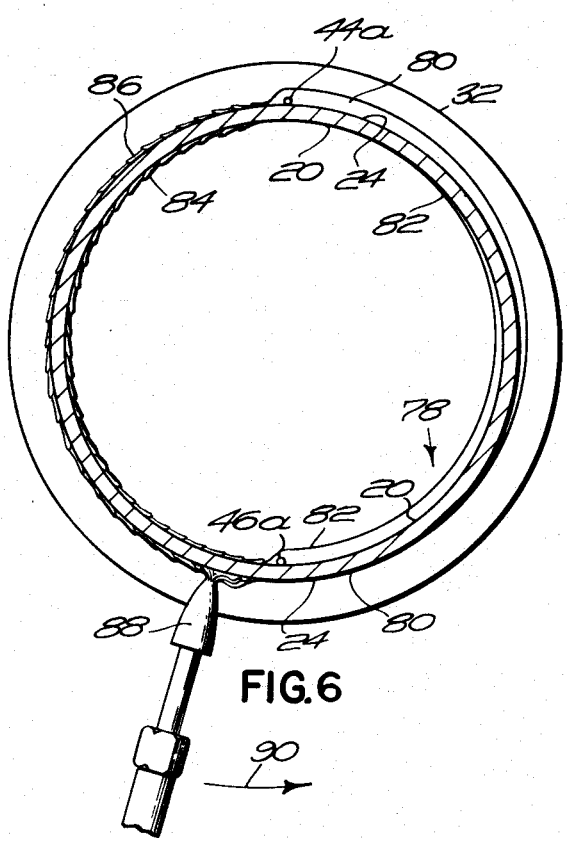
FIGURE 6 is a view similar to FIG. 5 but taken on line 6—6 of FIG. 4 and showing approximately one-half of the root pass weld completed.

Although the eccentricity of the ring as shown in FIGS. 4 to 6 is such that the inner and outer edges 82 and 80, respectively, of the ring 78 are flush with the interior and exterior root surfaces 20 and 24, respectively, at certain locations, it will be understood that this arrangement is not essential in the present invention and that the degree of weld metal sag anticipated under given welding conditions may require that the inner edge 82 of the ring 78 be either above or below the level of the interior root surfaces 20 at the top of the weld and that the outer edge 80 of the ring be either above or below the exterior root surfaces 24 at the bottom of the weld. The amount by which the width of the ring sides 92 and 94 differ from the width of the root faces 26, the inclination of the planes of the root faces 26 from the horizontal, the material of the piping sections and of the insert ring and the welding temperature employed are all factors which will determine the amount of eccentricity necessary to achieve proper compensation of weld metal sag throughout the root pass and will therefore determine the relationship of the inner and outer edges of the ring 82 and 80 with respect to the interior and exterior root surfaces 20 and 24, respectively, at the extreme uppermost and lowermost weld portions.

Figure 7:
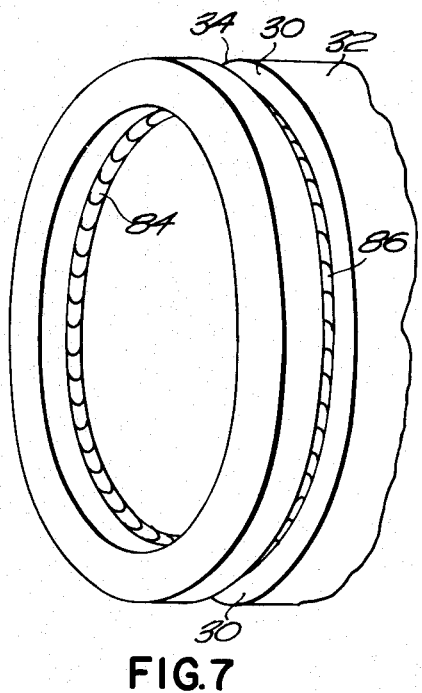
FIGURE 7 is a perspective view of a pipe joint with the root pass weld completed.
Figure 8:
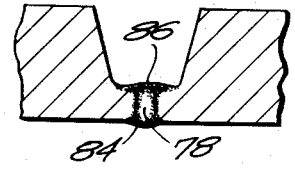
FIGURE 8 is an enlarged cross-sectional view of a root pass weld.
Figure 9:
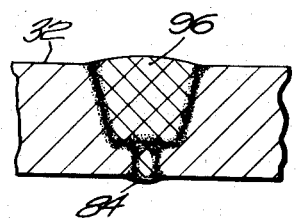
FIGURE 9 is an enlarged cross-sectional view of a completed weld.

FIG. 7 illustrates a typical completed root pass weld made with an improved eccentric insert welding ring of the present invention. FIG. 8 illustrates an enlarged cross-section of a root pass weld made of an improved insert ring of the present invention, and FIG. 9 illustrates a completed weld wherein the groove 34 has been filled with weld material 96.

Although the insert welding rings of this invention may be used to advantage in the root pass welding of pipe and tubing of a variety of compositions, the development of these rings was directed primarily toward the solving of the serious problem of microcracking in the root pass weld where the piping or tubing material is stainless steel. For example, these microcracking difficulties have been very marked in the welding of the columbium-stabilized Type 347 grade stainless steel (American Society for Testing Materials and American Iron and Steel Institute designation) which is a material now being widely used in power and chemical process piping where the operating temperatures, pressures and corrosive service conditions require the use of high quality stainless steel. A typical chemical composition of this Type 347 stainless steel pipe is as follows:

| | Percent |
|---|---|
| Carbon | 0.08 |
| Manganese | 1.54 |
| Silicon | 0.51 |
| Chromium | 17.64 |
| Nickel | 11.70 |
| Molybdenum | 0.36 |
| Columbium | 0.87 |
| Iron | 67.30 |

Such a composition is essentially a fully austenitic structure which is found to be particularly crack sensitive when welded. The tendency of this material to crack during welding is greatly reduced by the use of the solid insert rings as herein described when they are of the same composition as the piping material itself, but the tendency of this fully austenitic pipe material to crack is even further reduced when the insert welding ring material is of a composition slightly different than that of the pipe itself. Thus, for example, with a fully austenitic structure in the pipe material it is frequently preferred that the ring material be one which when mixed with the pipe material in the welding operation results in a fused weld metal having a partially ferritic structure. An example of such a ring structure has the following chemical composition:

| | Percent |
|---|---|
| Carbon | 0.08 |
| Manganese | 1.62 |
| Silicon | 0.43 |
| Chromium | 20.60 |
| Nickel | 8.80 |
| Molybdenum | 0.31 |
| Columbium | 0.71 |
| Iron | 67.45 |

According to the Schaeffler diagram (Metal Progress, vol. 56, p. 680, 1949) this welding ring composition is likely to contain a ferrite content of approximately 10%, the balance being essentially austenite. During welding of the root pass the heat will belt the insert ring metal and part of the root metal and cause mixing of these metals. The resulting mixed weld metal contains approximately 50% of the root metal and 50% of insert ring metal. In the experiments with the above stated pipe material (Type 347 grade, fully austenitic) and insert ring material (10% ferritic) the deposit contained approximately 3% ferrite as checked by magnetic measurements. Microcracking was eliminated as was demonstrated by actual weld tests.

In commercial applications good results have been obtained with the insert rings of the present invention using vairous commercial grades of stainless steel piping, as for example, Types 304, 310, 312, 316, 321, and 347 stainless steels (ASTM and AISI designations), and similarly good results have been obtained on nickel and Monel piping. Except in the cases where the composition of the pipe material is particularly crack sensitive, as in the case of the Type 347 austenitic stainless steel described, the insert ring metal is normally the same as that of the pipe metal.

The following percentage ranges for the elements in the insert ring metal preferred in welding Type 347 stainless steel when the latter is fully austenitic:

| | Percent |
|---|---|
| Carbon | Up to 0.08 max. |
| Manganese | 1.50–2.50 |
| Silicon | 0.25–0.75 |
| Chromium | 20.0–21.5 |
| Nickel | 8.5–10.0 |
| Columbium | 0.50–0.80 |
| Iron | Balance |

The type 347 grade stainless steel often has a composition rendering it partially ferritic. The following table illustrates the preferred percentage ranges of the elements in the insert ring metal for use with piping of such partially ferritic Type 347 grade:

| | Percent |
|---|---|
| Carbon | 0.07–0.10 |
| Manganese | 1.50–2.50 |
| Silicon | Up to 0.5 |
| Chromium | 18.5–20.0 |
| Nickel | 9.5–10.5 |
| Columbium | 0.60–0.90 |
| Iron | Balance |

In certain high temperature environments where the partially ferritic welds cannot be tolerated and the fully austenitic structure must be maintained, special stabilized stainless steel compositions having large manganese content have been found satisfactory as insert ring compositions. An example of one such composition is the following:

| | Percent |
|---|---|
| Carbon | 0.09 |
| Manganese | 3.04 |
| Silicon | 0.56 |
| Chromium | 15.67 |
| Nickel | 11.78 |
| Columbium | 0.95 |
| Iron | 67.91 |

Although each of the weld insert rings shown is of the endless type, i.e., continuous without any breaks, it is within the contemplation of the present invention to utilize strips which are preformed by bending into rings with both ends of each strip being juxtaposed so as to provide a substantially continuous ring.

This application is a continuation of my prior application Serial No. 472,911, filed December 3, 1954, for Insert Welding Rings (now abandoned).

I claim:

1. The method of butt welding together metal pipes whose ends lie in other than horizontal planes, said method including the steps of forming on the interior portion of said ends integral axially extending roots having root faces aligning the pipes with their root faces presented to each other and spaced apart; eccentrically inserting a preformed fusible flat metal ring between said root faces to provide a greater ring mass projecting above the lower half of the interior surfaces of the aligned and adjacent pipe ends than any which projects below the upper half of the said interior surfaces, said ring having an inner diameter smaller than the inner diameter of the pipe and an outer diameter greater than the outer diameter of the root faces but less than the outer diameter of the pipes and being of a composition such that when both it and the adjacent root faces are raised to a sufficiently high temperature the metal of the ring will fuse with the metal of the roots, whereby the asymmetrical distribution of ring metal with respect to the said interior surfaces will compensate for the gravitational sag of the ring metal upon its being heated to a molten state when the pipe ends lie in other than horizontal planes; applying welding heat to said ring and ends and fusing substantially all of said ring with the metal at the roots while the ends are held stationary in substantially aligned position and then depositing additional filler metal in the joint between said pipe ends while said ends are stationary to complete the welded joint.

2. The method of butt welding together the ends of metal pipes whose axes are substantially coaxial and inclined to a vertical plane, said method comprising the steps of forming on each of said ends an integral axially extending root adjacent the interior surface of the member; forming an end face on each root; aligning said pipes with the root faces aligned and spaced apart; eccentrically inserting a preformed flat, circular, fusible metal insert ring between said root faces so that its axis is parallel to the coincident axes of said integral roots, said ring having an inner diameter smaller than the inner diameter of the pipe and an outer diameter greater than the outer diameter of the root faces but less than the outer diameter of the pipes, the eccentric location of the ring placing a greater ring mass radially outwardly of the upper half of the interior surfaces of the aligned and adjacent roots than radially outwardly of the lower half of the said interior surfaces, said ring being of a composition such that when both it and the adjacent root faces are raised to a sufficiently high temperature the metal of the ring will fuse with the metal of the root ends, whereby the asymmetrical distribution of ring metal with respect to the said interior surfaces will compensate for the gravitational sag of the ring metal upon its being heated to a molten state when the pipes are positioned so that the root faces lie in other than horizontal planes; applying welding heat to said ring and root faces and fusing substantially all of said ring with the metal of the said integral roots while the ends are held stationary in substantially aligned position and then depositing additional filler metal in the joint between said pipe ends while said ends are stationary to complete the welded joint.

3. The method of butt welding together metal pipes whose ends lie in other than horizontal planes, said method including the steps of forming on the interior portion of said ends integral axially extending roots having root faces, aligning the pipes with their root faces presented to each other and spaced apart and their pipe axes substantially coincident, inserting a preformed fusible flat metal ring member between said end faces, said member having an inner diameter smaller than the inner diameter of the pipes and an outer diameter greater than the outer diameter of the root faces but less than the outer diameter of the pipes and being of a composition such that when both it and the adjacent root faces are raised to a sufficiently high temperature the metal of the insert member will fuse with the metal of the roots; locating said member between said ends to provide a quantity of insert material projecting inwardly from the lower half of the interior surfaces of the aligned and adjacent pipes, the quantity of insert material projecting inwardly being progressively less up the sides of the lower half from the bottom, whereby the progressive distribution of the insert material with respect to the said interior surfaces will compensate for the gravitational sag of the material upon its being heated to a molten state; applying welding heat to said insert member and ends and fusing substantially all of said insert member material with the metal of the roots while the ends are held stationary in substantially aligned position and then deposit additional filler metal in the joint between said pipe ends while said ends are stationary to complete the welded joint.

References Cited in the file of this patent

UNITED STATES PATENTS

| | | |
|---|---|---|
| 1,630,037 | Stresau | May 24, 1927 |
| 1,981,850 | Fisher | Nov. 27, 1934 |
| 2,040,140 | Kidd | May 12, 1936 |
| 2,042,100 | Houston | May 26, 1936 |
| 2,079,265 | Trainer | May 4, 1937 |
| 2,463,006 | Vander Clute | Mar. 1, 1949 |
| 2,681,028 | Phillips | June 15, 1954 |
| 2,731,933 | Phillips | Jan. 24, 1956 |
| 2,787,699 | Jessen | Apr. 2, 1957 |
| 2,792,490 | Risch et al. | May 14, 1957 |